(12) United States Patent
Sugiyama (10) Patent No.: US 8,540,371 B2
(45) Date of Patent: Sep. 24, 2013

(54) DISPLAY DEVICE

(75) Inventor: Takashi Sugiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 337 days.

(21) Appl. No.: 13/110,288

(22) Filed: May 18, 2011

(65) Prior Publication Data

US 2011/0285965 A1   Nov. 24, 2011

(30) Foreign Application Priority Data

May 21, 2010  (JP) .................................. 2010-117323

(51) Int. Cl.
| G03B 21/00 | (2006.01) |
| G03B 21/14 | (2006.01) |
| G03B 21/22 | (2006.01) |
| G03B 21/26 | (2006.01) |
| G03B 21/56 | (2006.01) |
| G03B 21/60 | (2006.01) |
| G02B 27/14 | (2006.01) |

(52) U.S. Cl.
USPC .................. 353/10; 353/13; 353/14; 353/28; 353/119; 359/443; 359/454; 359/630; 359/631

(58) Field of Classification Search
USPC ................. 353/10, 13–14, 28, 74, 77, 79–80, 353/119, 122; 359/443, 449, 454, 460, 478–479, 630–631; 349/11; 472/57–58, 61, 63
See application file for complete search history.

(56) References Cited

U.S. PATENT DOCUMENTS

| 5,291,297 | A  * |  3/1994 | Steinmeyer ...................... 348/44 |
| 5,528,425 | A  * |  6/1996 | Beaver ........................... 359/629 |
| 5,685,625 | A  * | 11/1997 | Beaver ............................. 353/28 |
| 5,865,519 | A  * |  2/1999 | Maass .............................. 353/28 |
| 6,783,247 | B2 * |  8/2004 | White .............................. 353/79 |
| 8,300,314 | B2 * | 10/2012 | Sugiyama ...................... 359/630 |
| 8,328,361 | B2 * | 12/2012 | O'Connell et al. ............. 353/10 |
| 2009/0231414 | A1* |  9/2009 | Graham et al. ............ 348/14.08 |
| 2012/0050876 | A1* |  3/2012 | Sugiyama et al. ............ 359/625 |
| 2012/0140325 | A1* |  6/2012 | Sugiyama et al. ............ 359/546 |

FOREIGN PATENT DOCUMENTS

| JP | 2001-255493 A  |  9/2001 |
| JP | 2009-223232 A  | 10/2009 |
| WO | WO 2007/116639 A1 | 10/2007 |
| WO | WO 2009/131128 A1 | 10/2009 |
| WO | WO 2009/136578 A1 | 11/2009 |

* cited by examiner

*Primary Examiner* — Tony Ko
*Assistant Examiner* — Jori S Reilly-Diakun
(74) *Attorney, Agent, or Firm* — Holtz, Holtz, Goodman & Chick, PC (57) ABSTRACT

A display device includes: a wall defining a viewer-side space; an observed object arranged in an object-side space partitioned off the viewer-side space by a portion of the wall; an imaging optical system of real specular image including a semitransparent substrate with a plane of symmetry for defining the viewer-side space and the object-side space as the portion of the wall to image a real image of the observed object in the viewer-side space with light passing through the substrate; a screen surface having a function of diffuse reflection and provided with the substrate so as to face the viewer-side space; and a projector optical system projecting an image on the screen surface in the viewer-side space.

6 Claims, 9 Drawing Sheets

DISPLAY DEVICE

BACKGROUND OF THE INVENTION

1. Field of the Invention

The present invention relates to a display device for allowing a viewer to see a real image of an observed object formed in the air by using an imaging optical system of real specular image.

2. Description of the Related Art

There has been developed a display device using a microlens-array which can visually provide a real image of an observed object such as a displayed image floating in the air to a viewer, for example (see Japanese Published Unexamined Patent Application No. 2001-255493). This display device uses an optical system of an erect equal magnification for a two dimensional image in which spatially parallel translation of the two dimensional image is realized by a display surface displaying a two dimensional image and an optical device having the same size of the display surface so as to optically make a displayed image in the air without distortion. Such configuration is useful for the optical device to come down in size and thickness in comparison with that using a normal lens, so that it contributes to compact the display device. However, even by such a display device, an actual real image of a three dimensional image is not obtained although the two dimensional real image like a stereoscopic image is obtained. Furthermore, since a viewer looks at the real image of refraction of light imaged by the microlens-array in such a display device, the viewer see the image only in the front of the microlens-array.

Whereas there has been developed a display device using an imaging optical system of real specular image (for example, see the international publication No. WO2007-116639) in which a micromirror array (configured with a plurality of dihedral corner reflectors each of which is composed of two specular surfaces being orthogonal to each other) is utilized so that a two dimensional image or three dimensional object to be projected alternatively a displayed image is observable in the air as a real specular image (real image). By the dihedral corner reflectors, the real image of the observed object is imaged at a position of plane symmetry with respect to the element surface (as plane of symmetry) without distortion. A display device using such dihedral corner reflectors allows a viewer to observe a two dimensional real image caused by a two dimensional object (or a three dimensional real image caused by a three dimensional object) from a viewpoint in an oblique direction in a space opposite to the observed object with respect to the element surface. In other words, the imaging optical system of real specular image is an imaging optical system partitioning a space in which the viewer exists (viewer-side space) off the space opposite to the viewer-side space (object-side space in which the object is placed) to image a real image of the observed object in the viewer-side space, while including a plane of symmetry between the observed object and the real image.

There is suggested a display device capable of displaying a real image of the observed object as a floating image in the front of the display surface of devices such as the instrument panel such as a meter cluster, namely viewer-side space, using the imaging optical system of real specular image allowing observation of areal image of the observed object from a viewpoint in an oblique direction with respect to the element surface (see Japanese Published Unexamined Patent Application No. 2009-223232). This publication of JP2009-223232 discloses an example in that, the real image of a displayed image on the display surface of an electronic display device (adapted as an observed object) is imaged in a space, in which nothing is originally expected to exist, in the front of the instrument panel at which a driver (viewer) looks while driving an automobile so that the floating attractive image may awaken attention of the viewer.

In case that the display device disclosed by the foregoing JP2009-223232 is adapted to the automobile, for example, there is seen in the driver's sightline direction both the displayed instrument panel and the floating image in the front thereof in the air, furthermore, such an image may be imaged to be moving so as to attract attention of the viewer. There is a demand to a display device capable of giving the driver the larger quantity of more impressive information.

SUMMARY OF THE INVENTION

In view of the above-mentioned problems, an object of the present invention is to provide a display device capable of visually providing the viewer impressive various information, using a combination of the real specular image of the observed object the imaging optical system of real specular image and a further projection image.

The display device according to the present invention is a display device including: a wall defining a viewer-side space; an observed object arranged in an object-side space partitioned off the viewer-side space by a portion of the wall; an imaging optical system of real specular image including a semitransparent substrate with a plane of symmetry for defining the viewer-side space and the object-side space as the portion of the wall to image a real image of the observed object in the viewer-side space with light passing through the substrate; a screen surface having a function of diffuse reflection and provided with the substrate so as to face the viewer-side space; and a projector optical system projecting an image on the screen surface in the viewer-side space. In an aspect of the present invention, the display device comprises: a display part or space provided on a back wall to face a viewer; a wall arranged in the front of the back wall near the viewer; the imaging optical system of real specular image provided along a portion of the wall to image a real image of the observed object; the screen surface provided along the portion of the wall to have a function of diffuse reflection and provided with; and the projector optical system casting a projection image on the screen surface, wherein the observed object is placed in a space opposite to the projector optical system.

According to such a display device, by using the imaging optical system of real specular image for imaging a real image of the observed object at a position of plane symmetry, the real specular image of the observed object may be observable from an oblique direction with respect to the plane of symmetry (substrate) in the viewer space in the front of the display part provided on the back wall, and further a projection image may be observable on the screen surface provided on the substrate being the wall, resulting in that these projection image and real specular image are simultaneously observable at the same position. As mentioned above, according to the present invention, both the images of imaged by the imaging optical system of real specular image and projected by the projector optical system are simultaneously observable with a large quantity of impressive. Further, the imaging optical system of real specular image may have a screen surface partially, and the imaging optical system of real specular image and the screen surface are provided individually as separate members respectively.

In the present invention, the plane of symmetry of the imaging optical system of real specular image and the screen surface may be placed at a position of an exposed wall portion between the projector optical system and the observed object. In this case, in order to avoid that the screen surface does not become an obstacle against imaging of the observed object with respect to a the plane of symmetry, it is preferable that the screen surface transmits light rays travelling from the observed object thereto or the light rays emitted by the observed object and bended to pass through the plane of symmetry.

There may be suitably utilized for the display part of an electronic display such as a liquid crystal display, a CRT display part and an organic EL display, as well as, one of display parts of mechanical meter instruments which is placed on the back wall of the display device. Furthermore, in the present invention of the display device, the side walls expanded from the back wall towards the viewer may be provided at least one of the upside, downside, right side and left side. The plane of symmetry in the imaging optical system of real specular image and the screen surface are provided at a portion of any one of the side walls. The projector optical system casting a projection image is provided along a portion of the wall so that a projection image is observable on the screen surface. Furthermore, the observed object for the real specular image to be imaged by the imaging optical system of real specular image is provided at the back side of the wall in which the plane of symmetry exists. A two dimensional solid body or three dimensional solid body or a displayed image is used for the observed object.

By using the display device above mentioned, it is possible that the display part and the projector optical system and the observed object are arranged at spatially separate positions, while both images, a displayed image on the display part and an image due to the imaging optical system of real specular image, exist in the sightline of the viewer at the same time. That is, the viewer can simultaneously observe a displayed image on the display part of the back wall, areal image of the observed object imaged in the front of the display part and a projection image casted on the screen surface. As mentioned above, since two images are observed in the front of the display part, a variety of information is obtained by the viewer in comparison to a case of the conventional display device (JP2009-223232), and furthermore, when a combination of two images is observable at the same time, impressiveness to the viewer is increased more.

A miniaturized LCD projector or the like may be used for the projector optical system in the present invention of the display device. It is preferable that the projector optical system is placed at a position for the viewer not to see directly in view of quality of the display device.

Furthermore, in case that the observed object is imaged on the display surface of an electronic display device, a change of the observed object will be easy, so that diversification of images visible to the viewer is obtained.

Furthermore, since the imaging optical system of real specular image adapted to the present invention has a feature to image a two dimensional real image caused by a two dimensional object (or a three dimensional real image caused by a three dimensional object), it allows the viewer to observe an impressive image when the observed object is set as a three dimensional image displayed on a display surface of an electronic 3-D display device capable of displaying a three dimensional image, alternatively, as a stereoscopic picture of two dimensional image.

Furthermore, when at least of the observed object and a projection image casted by the projector optical system is changed time-dependently and kinetically, at least of a real image of the observed object imaged in the front of the display part and a projection image casted on the screen surface will be seen by the viewer as a moving image. It is easily made that the observed object is time-dependently and/or kinetically changed by using an electronic display device, an actual body moving with the lapse of time is applicable to the observed.

In the present invention, the imaging optical system of real specular image is such that it allows a real image of the object to be seen from a viewpoint tilted from the plane of symmetry (substrate). A specific example of the imaging optical system of real specular image is the one with a dihedral corner reflector array. The dihedral corner reflector array is constructed of a number of dihedral corner reflectors arranged two-dimensionally each having two orthogonal mirror surfaces. A common flat surface orthogonal to all mirror surfaces is defined as an element surface with respect to which the object and a real image are symmetrical to each other. Each light ray emitted from the object is reflected once by each of the two mirror surfaces of each of the dihedral corner reflectors. Each reflected light ray is then caused to pass through the element surface of the dihedral corner reflector array. As a result, a real image of the object is formed at a position symmetrical to the object with respect to the element surface of the dihedral corner reflector array. When a surface of light diffuse reflection is disposed on the real image side (for example, an upper surface) of the element surface in the dihedral corner reflector, such a surface functions as a screen surface exhibiting a projection image casted by the projector optical system to the viewer. In this case it is essential that the screen surface does not obstruct light rays emitted from the observed object that transmit the element surface and bend though the element surface. Specifically a transparent condition area for light rays emitted from the observed object transmit and bend through the element surface may be formed within the screen surface and a light scattered and reflected condition area may be formed other than the transparent condition area. Further, the whole screen surface is processed to have a diffuse reflection of light but the scattering is reduced in such a manner that an image is obtained by light rays emitted from the observed object that transmit the element surface and bend though the element surface.

Next, it is considered that the dihedral corner reflector array and the screen surface are formed as one piece integrally. Regarding the dihedral corner reflector array, in order to allow light rays to pass through an element surface with appropriate bending by each dihedral corner reflector, interior walls of each of optical holes, assumed to lie in a direction to pass completely through the element surface, may be considered as a specular surface of the dihedral corner reflector array. Therefore, to enable the formation of the real image and make a screen surface on the upper plane of the dihedral corner reflector, such upper plane as a whole is used for the screen surface on which a projection image is imaged by the projector optical system. In this case it is important that the screen surface is made to have a small light scatter because light rays emitted from the object need to transmit and bend though the element surface. Alternatively, since the optical holes (dihedral corner reflector array) are dispersedly formed on the element surface, the screen surface may be formed on the upper face other than the optical holes of the dihedral corner reflector.

In simple terms, the dihedral corner reflector array is constructed of a large number of mirror surfaces substantially orthogonal to the element surface and arranged on the element surface. What should be taken into account in terms of structure is how the mirror surfaces are fixedly supported on the element surface. As an exemplary specific way of forming the mirror surfaces, a substrate for defining predetermined spaces is provided to have a plane in which the dihedral corner reflector array is arranged as an element surface and then inner walls of each optical hole are used as mirror surfaces of each of the dihedral corner reflectors where the optical holes are made so as to penetrate the element surface. The holes formed in the substrate are only required to be transparent for allowing respective light rays to pass therethrough. By way of example, the holes may be evacuated. Or, the holes may be filled with transparent gas or transparent liquid. The shape of each hole may arbitrarily be determined, as long as the holes each have one mirror surface on its inner wall functioning as a unit optical element, or two or more of such mirror surfaces not existing on the same plane, and each light ray reflected by the mirror surface is allowed to pass through the corresponding hole. The holes may be coupled, or may be of complicated structures as a result of their partial losses. As another example, different independent mirror surfaces stand together in large numbers on a surface of a substrate. In this case, it is understood that holes formed in the substrate are coupled to each other.

Further, the dihedral corner reflectors may be formed using a solid substance such as transparent glass or resin to have a prism shape as the optical hole. In the case where each prism body is formed from a solid substance, the prism bodies may be arranged close to each other to function as a support member of the elements. Also, if the dihedral corner reflector array has a substrate, the prism bodies may project from a surface of the substrate. The shape of the prism bodies may also arbitrarily be determined, as long as the prism bodies each have one mirror surface on its inner wall, or two or more of such mirror surfaces not existing on the same plane that allow the prism body to function as a dihedral corner reflector, and each light ray reflected by the mirror surface is allowed to pass therethrough. Although called prism bodies, they may be coupled, or may be of a complicated structure as a result of their partial losses.

Alternatively, for the dihedral corner reflector array, there may be utilized an optical device in which two mirror arrays (slit mirror arrays) each composed of plural long and narrow mirror bodies being arranged are overlapped in such a manner that the mirror bodies are orthogonal to each other, as disclosed in the international publications Nos. PCT/WO2009-131128 and PCT/WO2009-136578.

A shape of the optical hole should be considered, wherein all of the adjacent inner wall surfaces are orthogonal, as in a cube or a rectangular parallelepiped. In such a case, the gaps between adjacent dihedral corner reflectors can be minimized, and thereby highly dense arrangements are possible. It is preferable that reflection be prevented by a surface other than that of a dihedral corner reflector that faces an observed object.

In the case where a dihedral corner reflector has a plurality of inner mirror surfaces, some of the transmitted light may undergo multiple reflections, i.e., there may occur multiple reflections of light rays passing through the hole several times or more than that of assumed reflections. Regarding countermeasures for these multiple reflections, if two mutually orthogonal mirror surfaces are formed on the inner wall of an optical hole, such multiple reflections are prevented in the following ways. In one way, a surface other than these two mirror surfaces may be made non-specular to prevent reflection of light rays by this surface. In another way, a surface other than these mirror surfaces may be tilted from an element surface so that it may not orthogonal to the element surface, or may be curved. In either way, generation of the multiply reflected light ray reflected three times or more may be reduced, or prevented. In order to form a non-specular surface, the following configuration may be used in which a target surface may be coated with an anti-reflection coating or a thin film and, alternatively, the surface roughness of the target surface may be increased to cause diffuse reflection on the target surface. In addition, the existence of a transparent and flat substrate does not obstruct the functions of the optical element, and therefore any appropriate substrate may be used as a supporting member and/or a protective member.

In order to enhance the brightness level of a real image to be projected, it is desirable that a number of dihedral corner reflectors arranged on an element surface are as close as possible to each other. As an example, lattice arrangement of the dihedral corner reflectors is effective. Such an arrangement makes it easy to manufacture a display device, as a merit. A mirror surface of each dihedral corner reflector may be a flat surface for causing reflection of light rays, and which is made of a lustrous substance such as metal or resin, regardless of whether the substance is solid or liquid. A mirror surface of a dihedral corner reflector may also be such that it causes reflection or total reflection at a flat boundary interface between transparent media of different refractive indexes. In the case where a total internal reflection is used for the mirror surface, it is highly likely that the undesirable multiple reflections by the plurality of multiple mirror surfaces will exceed the critical angle of the total internal reflection, and therefore it is expected that these undesirable multiple reflections will naturally be suppressed. Additionally, the mirror surface may either be formed only on a limited part of the inner wall of an optical hole, or may be constructed of a plurality of unit mirror surfaces arranged in parallel, as long as each mirror surface serves its function without problems. Regarding the latter aspect, in other words, the formation of a mirror surface from unit mirror surfaces means that a mirror surface may be divided into a plurality of unit mirror surfaces. In this case, the unit mirror surfaces are not necessarily required to exist on the same plane, but are parallel. Furthermore, the unit mirror surfaces may be contact with each other, or may be spaced from each other.

Another specific example applicable in the present invention as an imaging optical system of real specular image is an optical system including a retroreflector array for causing retroreflection of light rays, and a second half mirror with a second half mirror surface for reflecting light rays and causing the light rays to pass therethrough. In this imaging optical system of real specular image, the second half mirror surface functions as a plane of symmetry, and the retroreflector array is arranged at a position that can cause retroreflection of light rays emitted from an observed object, and reflected by or passing through the second half mirror. The retroreflector array is arranged only in the object-side space defined by the second half mirror, and in which an observed object also exists. The position of the retroreflector array is such that light rays reflected by the second half mirror are retro-reflected by the retroreflector array. Herein "Retroreflection", that is the operation of a retroreflector, is a phenomenon in which each reflected light ray is reflected back to where it originated (or reversely reflected), thus the incoming light ray and the reflected light ray are parallel to each other and in opposite directions. A number of retroreflectors are arrayed to constitute the retroreflector array. If each of the retroreflectors is sufficiently small in size, paths of an incoming light ray and a reflected light ray are considered to overlap. The retroreflectors of the retroreflector array are not required to be on a plane surface, but may be on a curved surface. Furthermore, these retroreflectors are not required to be on the same plane, but may be scattered three-dimensionally. In addition, the second half mirror has two functions to cause light rays to pass therethrough and to reflect light rays.

A ratio between the transmittance and the reflectivity of the second half mirror is ideally 1:1. Furthermore, there is described in a case that a half mirror is used for a half mirror screen. The half mirror screen is composed of a half mirror body of a transparent plate having a half mirror surface with the ratio above mentioned at the observed object side and having at the opposite side, namely, real image side a screen surface on which a projection image is casted by the projector optical system. Herein, it is essential that the screen surface does not obstruct light rays emitted from the observed object that transmit the element surface and bend though the element surface. Specifically the half mirror screen formed of the transparent plate at the real image side has a light scatter reflect surface as a whole (screen surface) but the scattering is reduced in such a manner that a real image is obtained by light rays emitted from the observed object that transmit the element surface and bend though the element surface.

There may be utilized a retroreflector constructed of three adjacent mirror surfaces (called a "corner reflector" in a broad sense). Alternatively, a cat's eye retroreflector may be used as the retroreflector. As an example, a corner reflector is constructed of three mirror surfaces orthogonal to each other. As another example, the corner reflector has three adjacent mirror surfaces, where two of angles defined by the mirror surfaces are both 90 degrees, and the other angle is 90/N (where N is an integer) degrees. As still another example, the corner reflector is also an acute angle retroreflector with three mirror surfaces, where angles defined by three mirror surfaces are 90 degrees, 60 degrees and 45 degrees respectively.

If the imaging optical system of real specular image including the aforementioned retroreflector array and the second half mirror is used, some light rays emitted from an observed object are reflected by the second half mirror surface. Then, the reflected light is retro-reflected by the retroreflector array to return to where it originated in all cases, and then passes through the second half mirror surface. As a result, an image of the object is formed. Accordingly, as long as the retroreflector array is placed at a position that allows receipt of reflected light rays from the second half mirror, the shape and the position of the retroreflector array are not limited. A real image thereby formed is seen in a direction opposite to light rays passing through the second half mirror surface.

According to the display device of the present invention, the imaging optical system of real specular image is provided on a portion of the wall positioned near the viewer side from the back wall on which the display surface of an electronic display device or devices is mountable, wherein the observed object is placed at the inside surrounded by the wall in which the plane of symmetry is provided for the imaging optical system of real specular image. Therefore, the real specular image of the observed object is observable in the front of the display surface in the air as a displayed. Furthermore, a projection image casted on the screen surface by the imaging optical system of real specular image is observable. Therefore, these projection image and real specular image are observable at the same time and the same position of observation. As mentioned above, the present invention can provide a new display device capable of giving the driver impressive various information in such a manner that both images, one caused by the imaging optical system of real specular image and the other casted by the projector optical system, are simultaneously observable impressive.

BRIEF DESCRIPTION OF THE DRAWINGS

The aforementioned aspects and other features of the present invention are explained in the following description, taken in connection with the accompanying drawing figures wherein.

DETAILED DESCRIPTION OF THE INVENTION

A display device of an embodiment according to the present invention will be described herein below by referring to the drawings.

Figure 1:
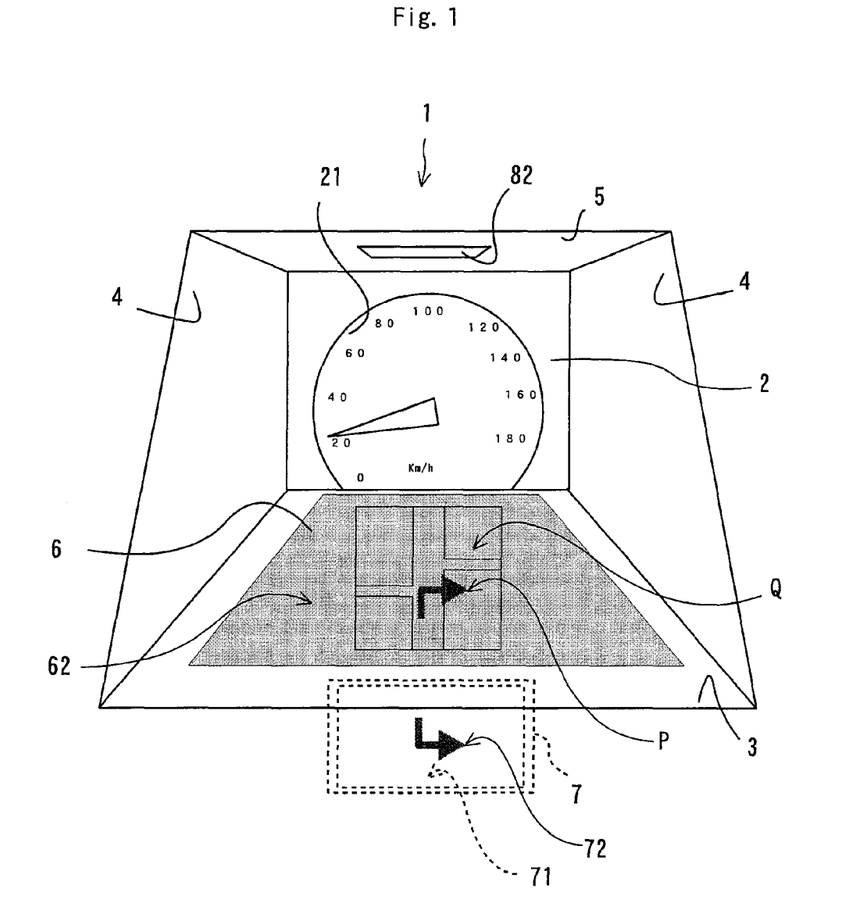
FIG. 1 is a schematic front view illustrating a display device of an embodiment of the present invention when viewed from a viewer side.
Figure 2:
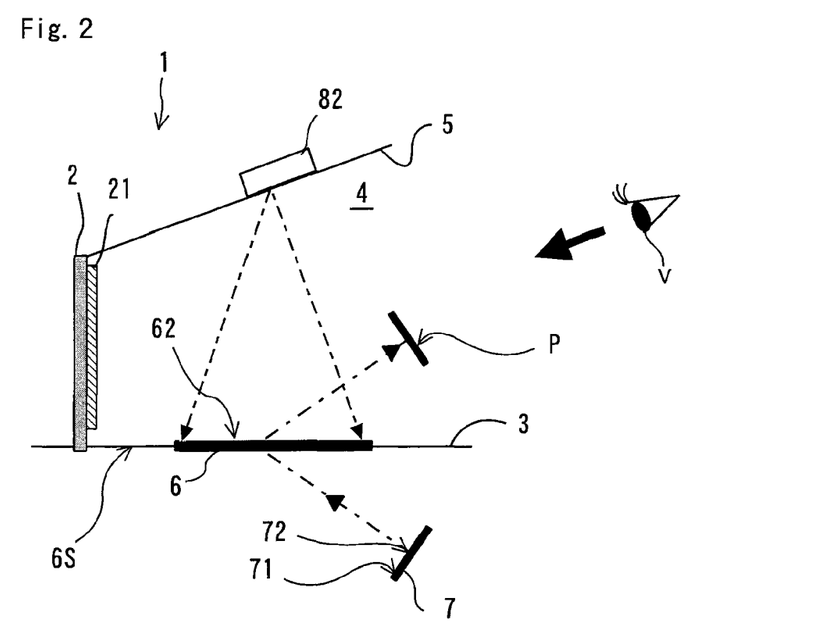
FIG. 2 is a schematic cross-sectional side view illustrating a principal part of the display device of the embodiment when viewed from a lateral side.

FIG. 1 is a schematic front view illustrating an instrument panel of a vehicle such as an automobile and its surroundings including a display device 1 of the embodiment of the present invention. FIG. 2 is a schematic sectional and perspective view for explaining the operation of the display device 1.

The display device 1 is made by applying the present invention to an instrument panel and to its surroundings on the driver's side of a transportation machine such as an automobile. Specifically, as shown in FIG. 2, the display device 1 includes a back wall 2 farthest from the viewpoint of a driver as a viewer V, a bottom wall 3, right and left side walls 4, 4, and an upper wall 5 connecting to the back wall 2 and arranged to surround a space in front of the back wall 2 when viewed from the driver, and a display part 21 as a part of the instrument panel (instruments) is arranged on the back wall 2. The display part 21 is made up, for example, of a liquid crystal display on which what is called a speedometer is displayed to give information about speed to the driver. The display part 21 is covered over with a transparent plastic plate (but not shown). It is needless to say, not only a speedometer but various instruments may be displayed in the display part 21 on the back wall 2.

In the present embodiment of the display device 1, a dihedral corner reflector array 6 is provided as an imaging optical system of real specular image on the bottom wall 3. An observed object 72 is arranged under the bottom wall 3 (namely, in an object-side space) in order that the dihedral corner reflector array 6 image a floating image P of the object in front of the back wall 2 above the bottom wall a (namely, in an viewer-side space). The observed object 72 in the present embodiment is a picture in a display surface 71 of a small-sized liquid crystal display panel 7. In the example of FIG. 1, the picture of the observed object 72 is displayed on the display surface 71 of the LCD panel 7. The picture on the display surface is made upside down in order to show the floating real specular image P the right side up. Further the picture of the observed object 72 is arranged outside of the sightline of the viewer or driver to be hidden from sight. As shown in FIG. 2, the display panel 7 is tilted from the element surface 6S described below with an acute angle smaller than 90° to correspond to the driver's sightline.

As shown in FIG. 2, furthermore, the present embodiment of the display device 1 has a projector optical system 82 provided on the upper wall 5 and a screen surface 62 provided on the bottom wall 3 to be formed on the surface of the dihedral corner reflector 6 in the viewer-side space. The projector optical system 82 comprises a light source, a projection display, a projection optics, etc. (not shown) to cast a projection image from the upper wall 5 to the screen surface 62 of the dihedral corner reflector 6. This projection image may be observed by the driver with the diffuse reflection of the screen surface 62 on the dihedral corner reflector 6. Further, a position of the dihedral corner reflector 6 (including the screen surface 62) on the bottom wall 3 may be suitably set and, positions of the display panel 7 and the projector optical system 82 on the walls may be also suitably set. The screen surface 62 is made to transmit light rays travelling from the observed object 72 thereto or allows light rays emitted by the observed object and bended to pass through the plane of symmetry.

As mentioned above, the present embodiment of the display device 1 comprises the dihedral corner reflector 6 as the imaging optical system of real specular image, and the observed object 72 of the picture provided in the object-side space. In the opposite side of the object-side space, the projector optical system 82 and the screen surface 62 are arranged. Each light ray emitted from the observed object 72 of the picture is reflected twice at each cell of the dihedral corner reflector 6 to pass through the dihedral corner reflector 6 and then pass through the screen surface 62 to make the real specular image P on the sightline of the viewer V. Thus, a projection image Q casted by the projector optical system 82 shown on the screen surface 62 overlapping the sightline of the viewer V, so that the viewer can see the real specular image P overlapping a projection image Q.

In the present embodiment, the display panel 7 may be used for a component of a car navigation system. The projector optical system 82 displays a road map as a projection image Q in real-time being dependent on moving of the automobile on the display surface of, in which the maps are previously stored with a software in the car navigation system, while the observed object 72 of the picture such as an arrow indicating an advance direction in the map is displayed on the display surface 71 of the display panel 7 corresponding to the changing map displayed. Further, since the real specular image P (observed object 72 of the picture) and the projection image Q of the map are need to be recognized with the right directions by the driver, the observed object 72 of the picture is displayed upside down.

Figure 3:
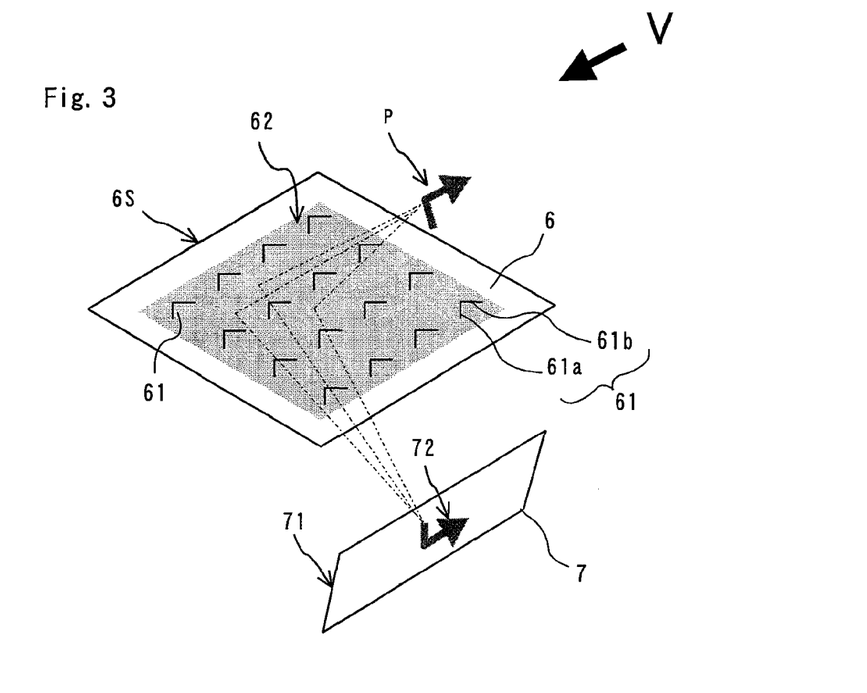
FIG. 3 is a schematic perspective view illustrating how an image is formed only by a dihedral corner reflector array applied to the embodiment.
Figure 4A:
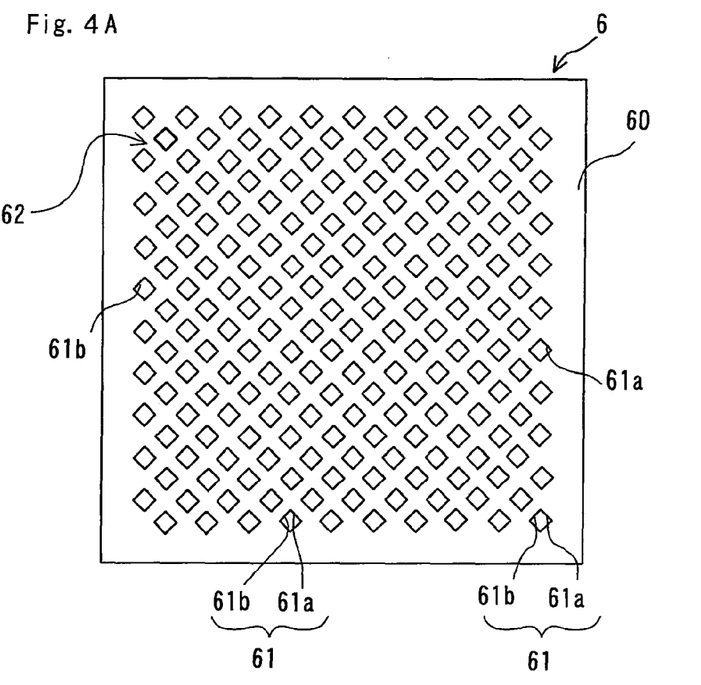
FIG. 4A is a schematic plan view illustrating a specific example of a structure of a dihedral corner reflector array applied to the display device of the embodiment.
Figure 4B:
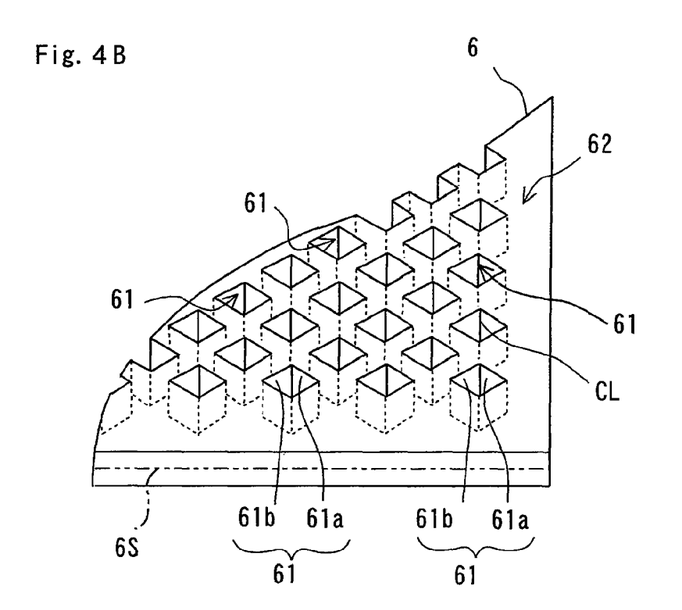
FIG. 4B is a partial cutaway perspective view illustrating the specific example of the structure of the dihedral corner reflector array applied to the display device of the embodiment.

Herein there is described the configuration and functions of the dihedral corner reflector 6 used in the present embodiment. FIG. 3 is a schematic perspective view illustrating how an image is formed only by a dihedral corner reflector array applied to the embodiment. FIGS. 4A and 4B are a schematic plan view and a partial cutaway perspective view each illustrating the specific example of the structure of the dihedral corner reflector array applied to the display device of the embodiment.

As is schematically shown in FIGS. 4A and 4B, the dihedral corner reflector array 6 is constructed of a large number of dihedral corner reflectors 61 each having two orthogonal mirror surfaces 61a and 61b. A flat surface substantially orthogonal to the two mirror surfaces 61a and 61b of each of the dihedral corner reflectors 61 is defined as an element surface 6S. The real specular image P of the object 72 is formed at a position plane-symmetrical to the object 72 with respect to the element surface 6S. In the present embodiment, the dihedral corner reflectors 61 are considerably small (on the order of micrometers) compared to the entire size (on the order of centimeters) of the dihedral corner reflector array 6. In FIG. 3, an aggregate of the dihedral corner reflectors 61 is shown in gray and a dihedral angle defined by the mirror surfaces are indicated by V shapes as showing an orientation of the interior corners thereof, so that the dihedral corner reflectors 61 are exaggeratedly shown in the figure.

For the dihedral corner reflector array 6 to bend each light ray and allow the light ray to pass therethrough, a following optical element may be used, in which a large number of physical and optical holes are formed in the flat surface of a flat plate substrate 60 in such a manner that the holes vertically penetrate the substrate 60 in the thickness direction wherein two orthogonal ones of the inner wall surfaces of every hole is formed as mirror surfaces 61a and 61b in order to use the inner wall surfaces of each hole to function as the dihedral corner reflector 61. To provide the substrate 60 at least with a semi-transmitting property, as shown in FIGS. 4A and 4B, a large number of physical and optical holes (one side of which ranges from 50 μm to 200 μm, for example) substantially rectangular (square, for example) in plan view for allowing each light ray to pass therethrough are formed in the thin flat plate substrate 60. Then, the mirror surfaces 61a and 61b are formed by smoothing and mirror finishing of two orthogonal and adjacent ones of the inner wall surfaces of each hole. As a result, the dihedral corner reflectors 61 each have the two mirror surfaces 61a and 61b functioning as reflective surfaces are provided. It is preferable that some of the inner wall surfaces of the holes that are not to form the dihedral corner reflectors 61 be subjected to no mirror finishing so that they will be made non-reflective, or be angled so that they will produce no multiply reflected light rays. It is also preferable that the dihedral corner reflectors 61 be arranged on regularly aligned lattice points so that the internal angles defined by the mirror surfaces 61a and 61b will be all positioned in the same direction on the substrate 60. Accordingly, a line of intersection CL of the two orthogonal mirror surfaces 61a and 61b of each of the dihedral corner reflectors 61 is preferably orthogonal to the element surface 6S. In the below, the direction of the internal angle defined by the mirror surfaces 61a and 61b is called the orientation (direction) of the dihedral corner reflector 61.

Exemplary formation of the mirror surfaces 61a and 61b is as follows. A metallic mold is prepared first. Then, a process such as a nanoscale cutting process, a nanoimprint process that is a nanoscale press process using a mold, or electroforming is performed on the inner wall surfaces so that the inner wall surfaces function as the mirror surfaces 61a and 61b. The mirror surfaces 61a and 61b thereby formed are processed such that their surface roughness is equal to, or less than, 10 nm, and that they uniformly function as mirror surfaces in a visible light spectral range. When the substrate 60 is formed by electroforming with metal such as aluminum or nickel, the mirror surfaces 61a and 61b become natural mirror surfaces if the surface roughness of the mold is sufficiently small. When a nanoimprint process is used to apply resin and the like as a material of the substrate 60, mirror coating should be performed by a process such as sputtering to form the mirror surfaces 61a and 61b. Transmittance of light is enhanced by controlling a space between adjacent ones of the dihedral corner reflectors 61 to its minimum possible level. The structure of the dihedral corner reflector array 6 is not limited to those described above. The structure of the dihedral corner reflector array 6 and a method of forming the same may suitably be employed, as long as a large number of dihedral corner reflectors 61 are each formed by the two orthogonal mirror surfaces 61a and 61b, and the dihedral corner reflectors 61 each function as an optical hole for allowing each light ray to pass therethrough and having the screen surface 62 on the upper side thereof.

In each of the dihedral corner reflectors 61 constituting the dihedral corner reflector array 6, light rays entering the corresponding hole via the rear side (object-side space) are reflected by one mirror surface 61a (or 61b). The reflected light ray is further reflected by the other mirror surface 61b (or 61a), and is then caused to pass through the dihedral corner reflector 61 via the front side (viewer-side space) so that each dihedral corner reflector has a so-called twice reflection function. A path along which each light ray enters the dihedral corner reflector 61 and a path along which the light ray exits the dihedral corner reflector 61 are plane-symmetrical to each other with respect to the element surface 6S. Specifically, assuming that the element surface 6S is a surface passing the central portion of the height of each mirror surface and orthogonal to each mirror surface, the element surface 6S is a plane of symmetry with respect to which the position of the real image formed as a floating image, i.e., real specular image P of the object 72 is plane-symmetrical to the object 72.

Figure 5:
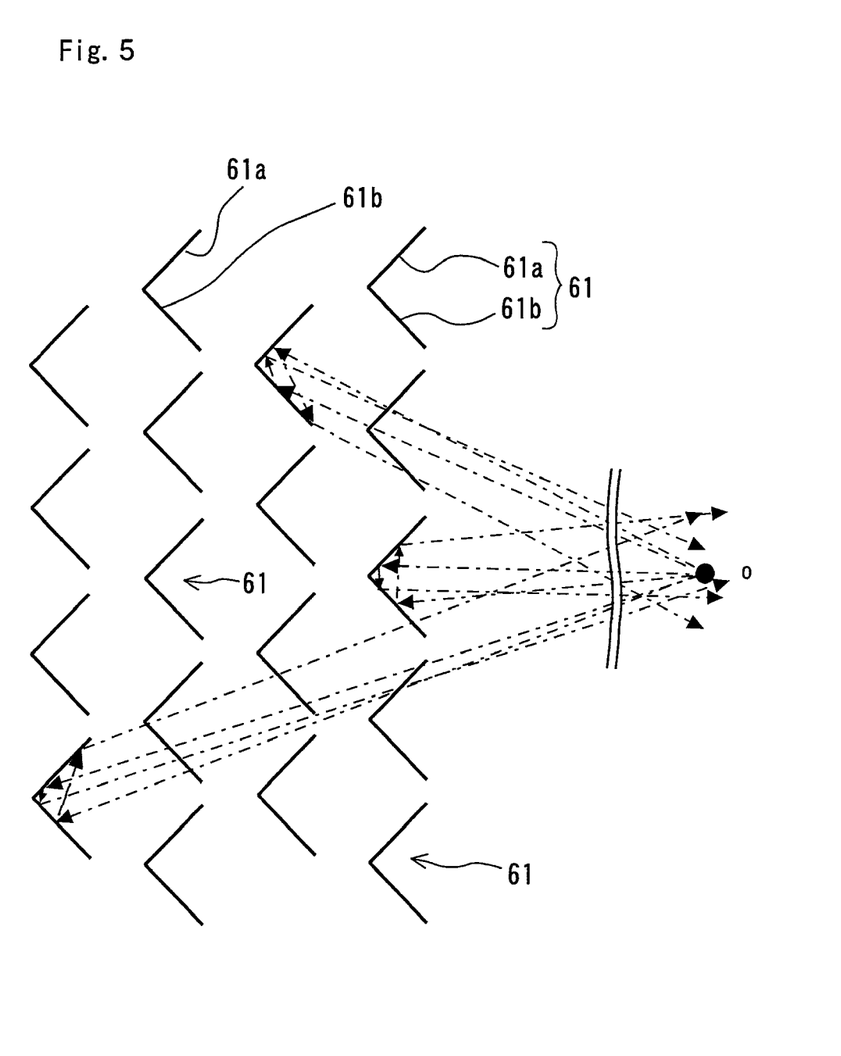
FIG. 5 is a schematic plan view illustrating how an image is formed by the dihedral corner reflector array applied to the display device of the embodiment.
Figure 6:
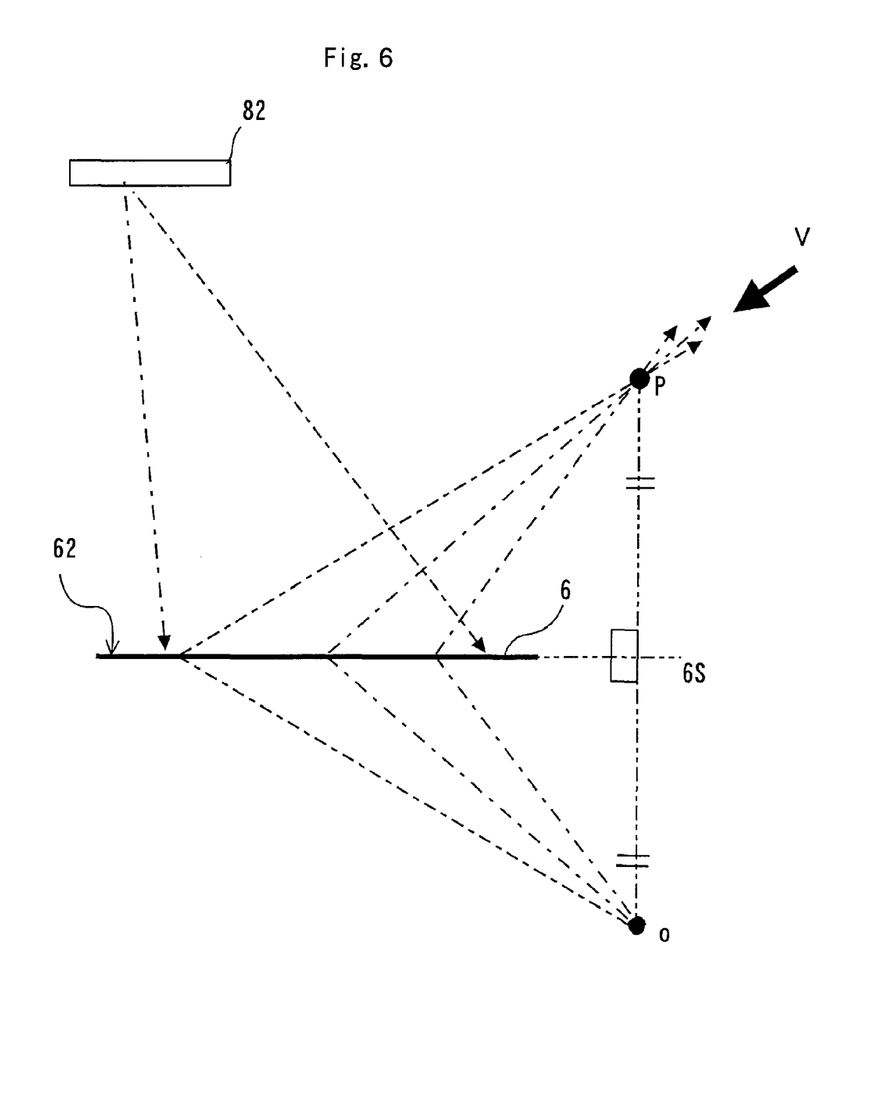
FIG. 6 is a schematic side view illustrating how an image is formed by the dihedral corner reflector array applied to the display device of the embodiment.

Briefly described next together with a path of each light ray emitted from a point light source (o) as an observed object is how an image is formed by the dihedral corner reflector array 6. FIG. 5 is a schematic plan view of the dihedral corner reflector array 6, and FIG. 6 is a schematic cross-section view of part of the dihedral corner reflector array 6. In FIG. 5, the dihedral corner reflectors 61 and the mirror surfaces 61a, 61b are shown to be quite exaggerated in comparison to the entirety of the dihedral corner reflector array 6.

As is shown in FIGS. 5 and 6, when passing through the dihedral corner reflector array 6, light rays emitted from the point light source (o) (indicated by one-dot arrowed chain lines traveling from the back toward the front on the drawing when viewed three-dimensionally in FIG. 5) are each reflected once by one mirror surface 61a (or 61b), and is reflected further by the other mirror surface 61b (or 61a) of each of the dihedral corner reflectors 61. Next, the reflected light rays pass through the element surface 6S, and then pass in dispersion a point that is plane-symmetrical to the point light source (o) with respect to the element surface 6S of the dihedral corner reflector array 6. Incoming light rays and reflected light rays are shown to be parallel in FIG. 5. The reason therefor is as follows. In FIG. 5, the dihedral corner reflectors 61 are shown to be exaggeratedly large in comparison to the point light source (o). However, the actual size of the dihedral corner reflectors 61 is considerably small. Accordingly, incoming light rays and reflected light rays nearly overlap each other when the dihedral corner reflector array 6 is viewed from above. (In FIG. 5, paths of light rays that first fall on both of the two mirror surfaces (61a, 61), namely, two paths, of each of the dihedral corner reflectors 61 are shown. In FIG. 6, only one light ray that first falls on either of the mirror surfaces is shown in order to avoid complication.) In summary, light rays converge to a position plane-symmetrical to the point light source (o) with respect to the element surface 6S, so that a real image is formed at a position (p) shown in FIGS. 5 and 6.

As mentioned above, since the dihedral corner reflector 6, being built in the bottom wall 3, has a function to image a real image P of the observed object 72 of the picture at the plane-symmetrical position with respect to the element surface 6S, the real specular image P (of the observed object 72 of the picture) is projected in the viewer-side space in front of the display part 21 formed on the back wall 2 (when the viewer or driver see it) as shown in FIG. 1. Namely, since an attention image is given in a space in which nothing is originally expected to exist, this image can facilitate to attract attention of the viewer. Furthermore, since the real specular image P of the observed object 72 of the picture is floated in the front of the display part 21 of the instruments, it usefully contributes to a safe driving so that the viewer (driver) may see the attention image without turning eyes away the display part 21.

Herein the real specular image P seen by the viewer may be stable at a point in the space, alternatively the movement of the real image P in the front of the back wall 2 above the bottom wall 3 such as a movement of the display panel 7 per se or the picture of the observed object 72 displayed on the display surface 71 is so useful to call the viewer's attention.

Furthermore, since the screen surface 62 formed on the upper of the dihedral corner reflector 6 has a diffuse reflection function of the projection image casted by the projector optical system 82, such projection image from the projector optical system 82 and the real image P are simultaneously observed by the viewer as shown in FIG. 6, in which the projector optical system 82 exists (the same side of the real specular image P) opposite to the point light source (o) with respect to the element surface 6S.

As mentioned above, in the present embodiment of the display device 1 adapted to the instrument panel of the automobile, the display part 21 of the instruments is provided on the back wall 2; the dihedral corner reflector 6 is provided on the bottom wall 3 protruding from the back wall toward the driver side; the projector optical system 82 is arranged on the upper wall 5; wherein the displayed image on the display surface of the projector optical system 82 is used as well as the observed object 72 of the picture displayed the display surface 71 of the liquid crystal display panel 7 is used under the bottom wall 3. Therefore, according to the display device 1, the real specular image P of the observed object 72 of the picture is floated near the driver's sightline to the display part 21 in the front of the display part 21 and, at the same time, the projection image on the screen surface 62 is formed in the same sightline wherein both the images are linked in the car navigation system to function an image in such a manner that the projection image and the real specular image P are simultaneously observed by the viewer. Therefore, the present display device 1 gives the driver impressive various information in comparison to a conventional display device in which only a real specular image P is observed in a space in the front of the display part.

Further, the observed object is not limited to a two dimensional image. Three dimensional image or three dimensional solid body is usable for the observed object, so that the real specular image P is formed stereoscopically. In case that the dihedral corner reflector 6 is used, since the real specular image P is reversed in depth to the observed object. Therefore a reversed observed object should be made in depth previously so that the driver will see the real specular image having the right depth.

Figure 7A:
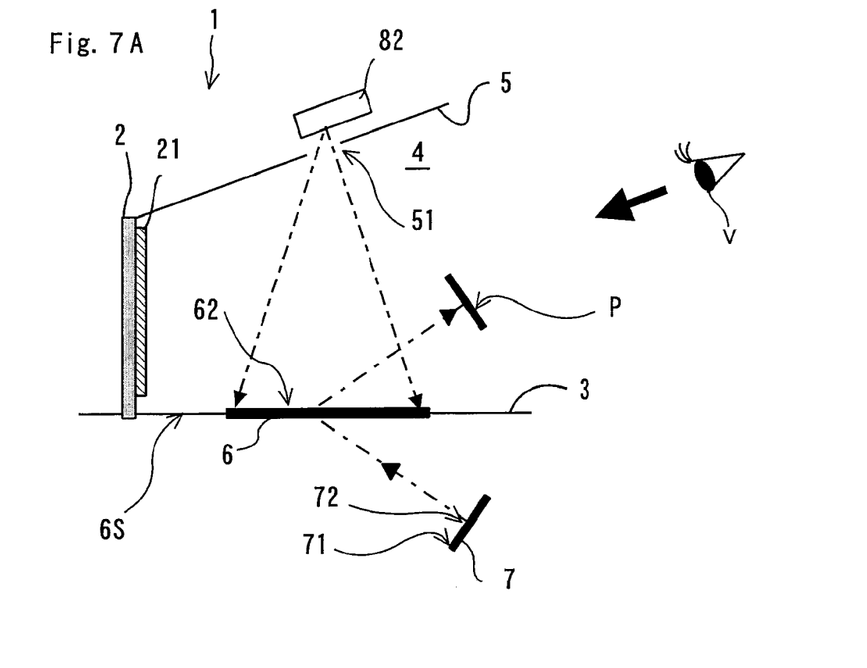
FIGS. 7A and 7A are schematic cross-sectional side views each illustrating a principal part of display devices of respective another embodiments according to the present invention when viewed from a lateral side.
Figure 7B:
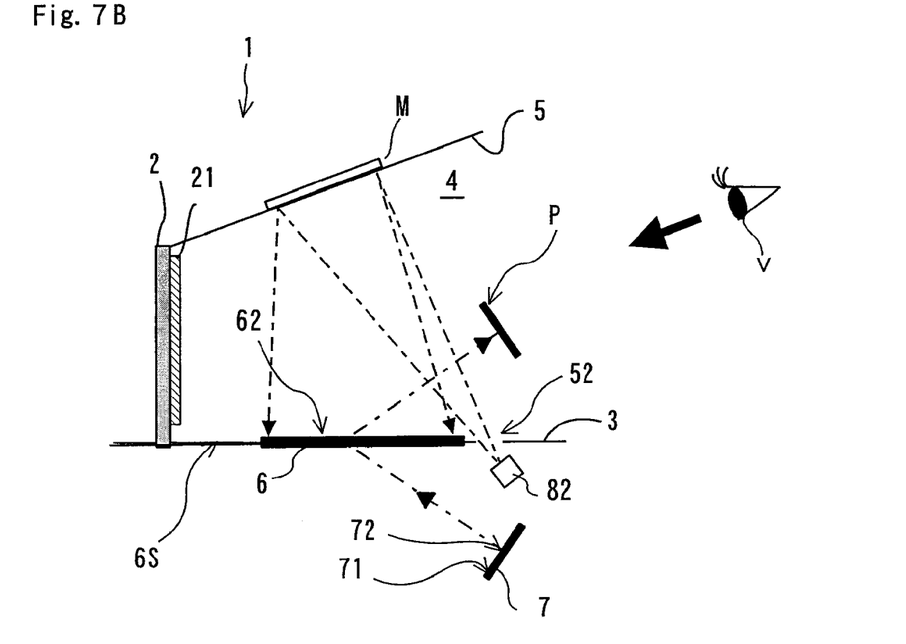

Furthermore, the embodiment is not limited to the projector optical system 82 arranged on the upper wall 5 seeable as the foregoing embodiment. There is a modification as shown in FIG. 7A in which an opening 51 is partially formed on the upper wall 5 and the projector optical system 82 is disposed inside surrounded by the upper wall 5 so that the projector optical system cast light through the opening 51 to the screen surface 62. This configuration hides the projector optical system 82 with the upper wall 5 from the sightline of the driver. There is a further modification as shown in FIG. 7B in which a mirror M is disposed on the upper wall 5 and an opening 52 is partially formed on the bottom wall 3 and the projector optical system 82 is disposed inside surrounded by the bottom wall 3 in such manner that the projector optical system cast light through the opening 52 via the mirror M to the screen surface 62 on the bottom wall 3. This configuration hides the projector optical system 82 with the bottom wall 3 from the sightline of the driver and facilitates to make a component about the mirror M of the upper wall 5 side thin and compact in the projector optical system. This is preferred for an in-vehicle display device.

In addition, the upper surface of the dihedral corner reflector 6 is performed with a minute unevenness finishing process to form the screen surface 62 in the present embodiment. Furthermore the screen surface 62 may be formed by adhesion of a light scattering thin film on the upper surface of the dihedral corner reflector 6. In this case it is important to select one from light scattering thin films having small light scattering effects for the screen surface. This is because the dihedral corner reflector 6 has to have a function to transmit and bend light rays from the observed object to make a real image.

Figure 8:
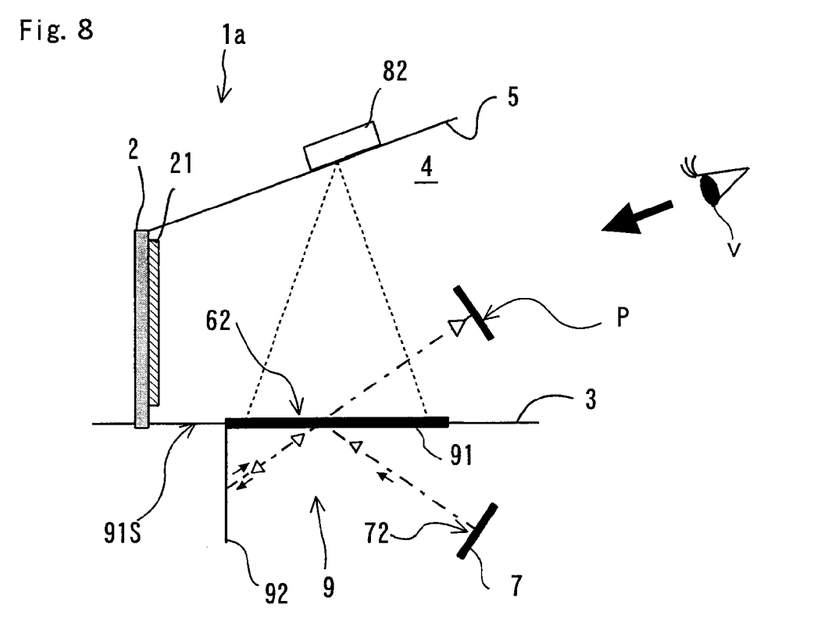
FIG. 8 is a schematic side view illustrating how a light ray is retro-reflected by a retroreflector array and retroreflectors applied to an imaging optical system of real specular image of another embodiment according to the present invention.
Figure 9:
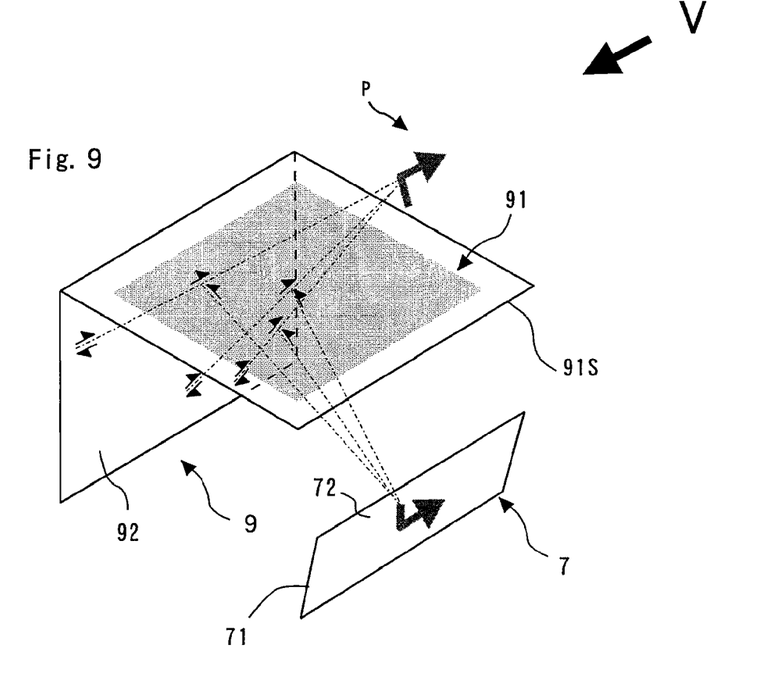
FIG. 9 is a schematic perspective view illustrating how light rays retro-reflected by a retroreflector array and retroreflectors applied to an imaging optical system of real specular image of another embodiment according to the present invention.

FIG. 8 schematically shows a still another embodiment of a display device to which the present invention is applied. FIG. 9 is a schematic perspective view illustrating how an image is formed by combination of the half mirror with the dihedral corner reflector array applied to the display device of the embodiment. A display device 1a differs only in an imaging optical system of real specular image from the display device 1 of the foregoing embodiments. Accordingly, structural elements of the display device 1a same as those of the display device 1 are described with the same names and the same reference numerals adapt.

An imaging optical system of real specular image adapted to the present embodiment is formed by combining a half mirror screen 91 and a retroreflector array 92. The half mirror screen 91 is provided on the bottom wall 3 functioning as the wall. A surface of the half mirror becomes an element surface 91S functioning as a plane of symmetry. The half mirror screen 91 (corresponding to the substrate 60 of the foregoing embodiment) partitions the viewer V (viewer-side space) from an opposite space (object-side space). An observed object 72 and the retroreflector array 92 are arranged in the object-side space. Each light ray emitted from the object 72 is reflected by the half mirror screen 91, and is then guided to the retroreflector array 92. The retroreflector array 92 has a function to cause retroreflection of each light ray from the half mirror screen 91. Accordingly, the light ray guided to the retroreflector array 92 returns to the half mirror screen 91. After passing through the half mirror screen 91, so that a real image is formed in a space within the sightline of the viewer V.

In this embodiment similarly to the embodiment of the display device 1, the display panel 7 displaying the observed object 72 of the picture (original of the floating image) is arranged inside surrounded by the bottom wall 3; and further the retroreflector array 92 is arranged to face the display panel 7; and further the projector optical system 82 is arranged on the upper wall 5. Further, the projector optical system 82 and the display panel 7 are included as components in the car navigation system so as to show the images linked to each other.

A transparent thin plate such as a transparent plastic film, glass plate, etc. having a reflection thin film coated at one side (lower side) thereof is utilized for the half mirror screen 91. This transparent thin plate has a screen surface at the opposite side (upper side) on which a minute unevenness surface is formed through a sand-blasting process wherein the screen surface has a relatively low scattering so far as it allows light rays emitted from the observed object to image a real image.

Figure 10A:
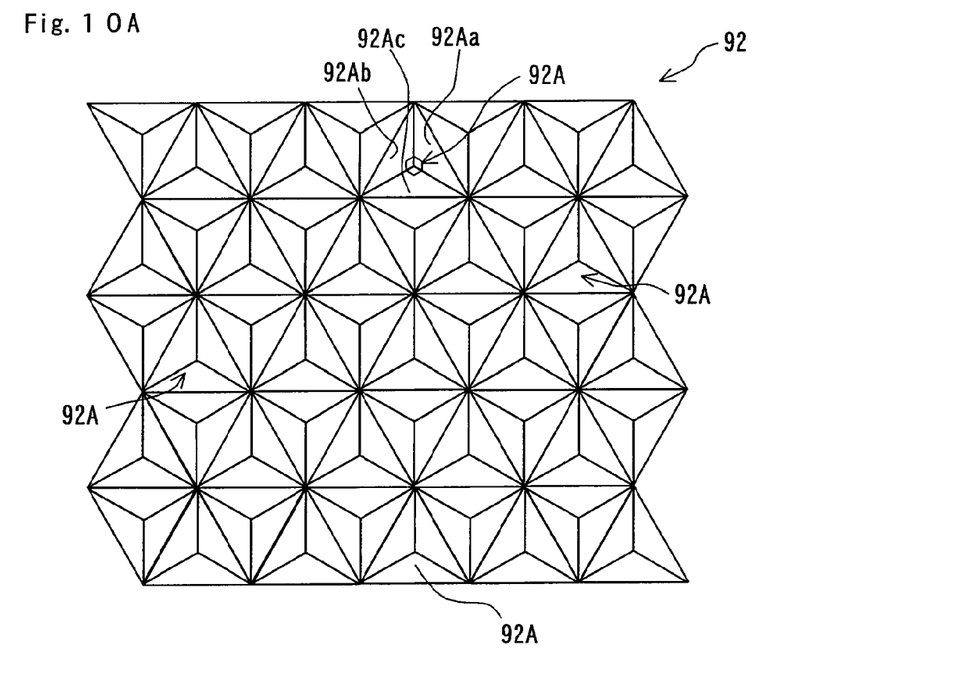
FIG. 10A is a schematic partial plan view illustrating a retroreflector array applied to the imaging optical system of real specular image.
Figure 10B:
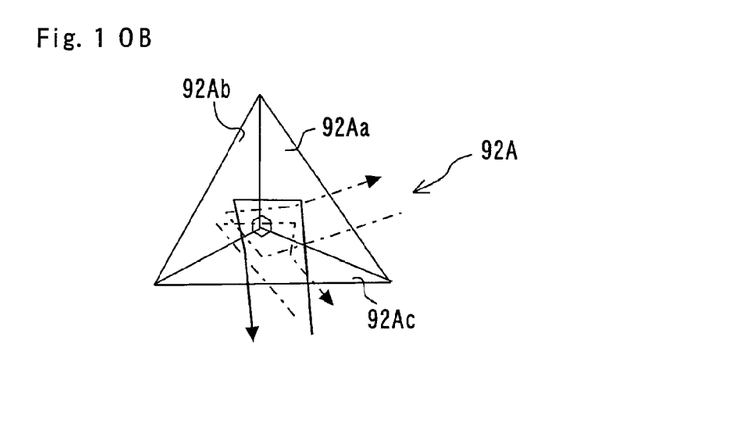
FIG. 10B is a schematic enlarged partial plan view illustrating how a light ray is retro-reflected by an exemplary retroreflector of the retroreflector array shown in FIG. 10A.

Whereas, the retroreflector array 92 may be of any type as long as it strictly causes retroreflection of an incoming light ray. The retroreflector array 92 may be formed by applying a retroreflective material or a retroreflective coating to a material surface. Furthermore, the retroreflector array 92 may have a curved surface, or a flat surface. For example, a retroreflector array 92 (a part of which shown in FIG. 10A illustrating a front view in an enlarged manner) is a corner cube array as an aggregate of corner cubes each utilizing one of the internal angles of a cube. Retroreflectors 92A is a corner cube array consisting of a regulated set of corner cubes, each of which is obtained as one inner corner of a cube. Each retroreflector 92A is formed by concentrating three mirror surfaces 92Aa, 92Ab and 92Ac, in the shape of identically shaped and sized isosceles right triangles joined at a common point, showing an equilateral triangle shape when seen from the front; with those three mirror surfaces 92Aa, 92Ab and 92Ac are orthogonal to each other to form one common corner cube (FIG. 10B).

Figure 11A:
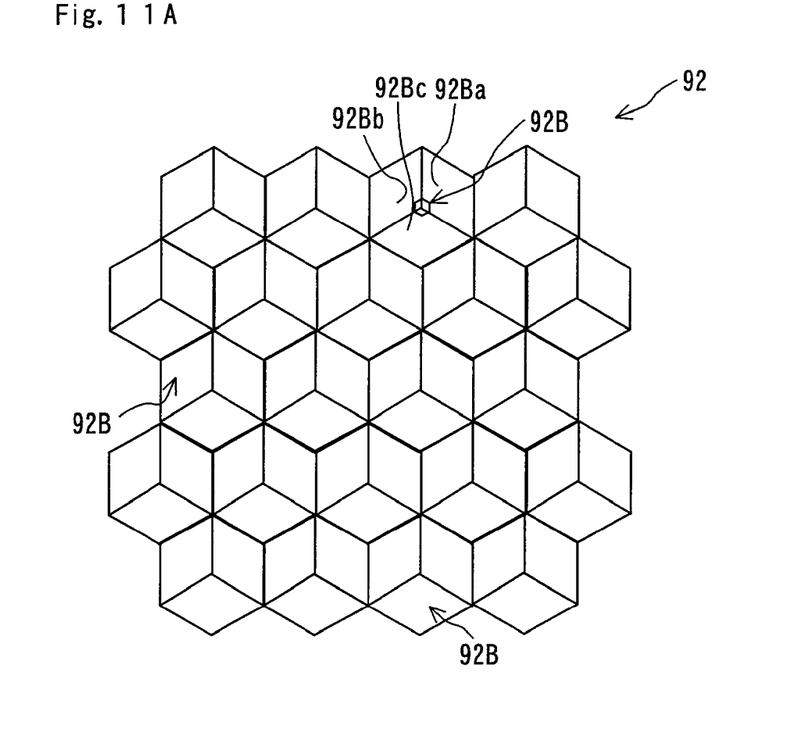
FIG. 11A is a schematic partial plan view illustrating another retroreflector array applied to the imaging optical system of real specular image.
Figure 11B:
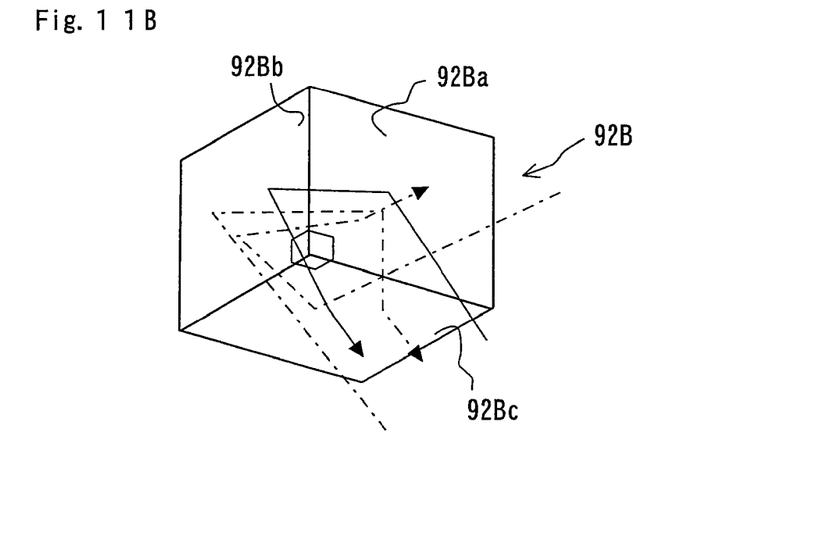
FIG. 11B is a schematic enlarged partial plan view illustrating how a light ray is retro-reflected by an exemplary retroreflector of the retroreflector array shown in FIG. 11A.

FIG. 11A is also a front view showing part of another retroreflector array 92 in an enlarged manner. This retroreflector array 92 is also a corner cube array as a regulated aggregate of corner cubes each utilizing one of inner corners of a cube. Retroreflectors 92B each have a shape of an equilateral hexagon, when viewed from the front, formed by concentrating three mirror surfaces 92Ba, 92Bb and 92Bc in the form of squares of the same shape and the same size joined at a common point. The three mirror surfaces 92Ba, 92Bb and 92Bc are orthogonal to each other (FIG. 11B).

Although the retroreflector arrays 92 shown in FIGS. 11A and 11A are different in shape from that shown in FIG. 10A, their principles of retroreflection are the same. The principle of retroreflection of the retroreflector arrays 92 is explained referring to FIGS. 10A and 11A and FIGS. 10B and 11B. A light ray entering one of the mirror surfaces (92Aa or 92Ba, for example) of the retroreflector 92A or 92B is sequentially reflected by a different mirror surface (92Ab or 92Bb), and by the other mirror surface (92Ac or 92Bc). Accordingly, the light ray is reflected back to a place from which it entered the retroreflector 92A or 92B. A path of a light ray entering the retroreflector array 92 and a path of a light ray exiting the retroreflector array 92 do not overlap, but in a strict sense, parallel to each other. If the retroreflector 92A or 92B is sufficiently small compared to the retroreflector array 92, paths of incident and outgoing light rays may be considered as overlapping each other. These two types of corner cube arrays differ from each other in the following. The corner cube array with mirror surfaces in the form of isosceles triangles is relatively easy to make but is somewhat low in reflectivity, while the corner cube array with mirror surfaces in the form of squares is relatively difficult to make but is high in reflectivity.

An alternative to the aforementioned corner cube arrays may be used as the retroreflector array 92, as long as the alternative (that is called a "corner reflector" in a broad sense) causes retroreflection of a light ray by using three mirror surfaces. While it is not shown here, for instance, an exemplary unit retroreflector to be applied in the embodiments has three mirror surfaces, two of which are orthogonal to each other, and the other is at an angle 90/N (N is an integer) degrees with respect to the other two. Another example of the unit retroreflector is an acute angle retroreflector with three mirror surfaces, where angles defined between adjacent ones of the mirror surfaces are 90, 60 and 45 degrees respectively. A cat's eye retroreflector may also be applied as the unit retroreflector. These retroreflector arrays may be planar, curved, or warped. The location of the retroreflector array may suitably be determined, as long as alight ray emitted from an observed object and reflected by the half mirror screen 91 is retro-reflected by the retroreflector array.

In the display device 1a including the imaging optical system of real specular image 9 having the half mirror screen 91 and the retroreflector array 92, as shown in FIGS. 8 and 9, each light ray emitted from the picture of the observed object 72 displayed on the display surface 71 of the display panel 7 is reflected to the retroreflector array 92 by the half mirror 91S of the half mirror screen 91. The retroreflector array 92 retro reflects each light ray, and after that, the half mirror screen 91 allows the light ray to pass therethrough, so that the retroreflector array 92 makes a real specular image P at a position plane-symmetrical to the object with respect to the half mirror 91S. Namely, the half mirror 91S functions as a plane of symmetry between the observed object 72 and the real specular image P. Therefore a real image P is seen as an image floating in a space within the sightline of a viewer (driver) in a direction slanting to the mirror surface of the half mirror 91, similarly to the display device 1 having a dihedral corner reflector array 6. Furthermore, since the half mirror screen 91 functions as a screen surface displaying a projection image projected by the projector optical system 82, the both images are seen as projection images in the sightline of the viewer. That is, when using the display device 1a, the projection image and the real image P of the observed object 72, the both linked each other, are simultaneously observed by the viewer similarly to the display device 1.

The specific structure of each constituent part of the display device may suitably be changed without departing from the purport of the present invention. As an example, the present invention is applied to a display device for making a floating image in a space in front of a display part of the display device.

The present invention is applicable as a display device for advertising purposes, and as an information display device for use in vehicles.

The present invention is usable to a displaying means for exhibiting information to the driver or passenger or an information display device of vehicle interior.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed embodiments but may be practiced within the full scope of the appended claims.

This application is based upon and claims the benefit of priority from the prior Japanese Patent Application No. 2010-117323, filed May 21, 2010, the entire contents of which are incorporated herein by reference.

What is claimed is:

1. A display device, comprising:
a wall defining a viewer-side space;
an observed object arranged in an object-side space partitioned off the viewer-side space by a portion of the wall;
an imaging optical system of real specular image including a semitransparent substrate with a plane of symmetry for defining the viewer-side space and the object-side space as the portion of the wall to image a real image of the observed object in the viewer-side space with light passing through the substrate;
a screen surface having a function of diffuse reflection and provided with the substrate so as to face the viewer-side space; and
a projector optical system projecting an image on the screen surface in the viewer-side space.

2. The display device according to claim 1, wherein the screen surface transmits light rays travelling from the observed object thereto or the light rays emitted by the observed object and bended to pass through the plane of symmetry.

3. The display device according to claim 1, wherein the imaging optical system of real specular image is an optical element functioning as a dihedral corner reflector.

4. The display device according to claim 1, wherein the imaging optical system of real specular image is formed by a combination of a half mirror and a retroreflector array.

5. The display device according to claim 1, wherein the observed object is a three dimensional image displayed on a display surface of an electronic display device.

6. The display device according to claim 1, wherein at least one of the image projected by the projector optical system and the observed object is an image time-dependently or kinetically changed.

* * * * *